Sept. 15, 1970  A. J. BOUWMEESTER  3,529,154
ELECTRON BEAM APPARATUS HAVING MEANS TO SELECTIVELY UTILIZE
A LUMINESCENT SCREEN OR A PHOTOGRAPHIC PLATE
Filed Aug. 11, 1967  2 Sheets-Sheet 1

INVENTOR.
AREND J. BOUWMEESTER
BY
AGENT

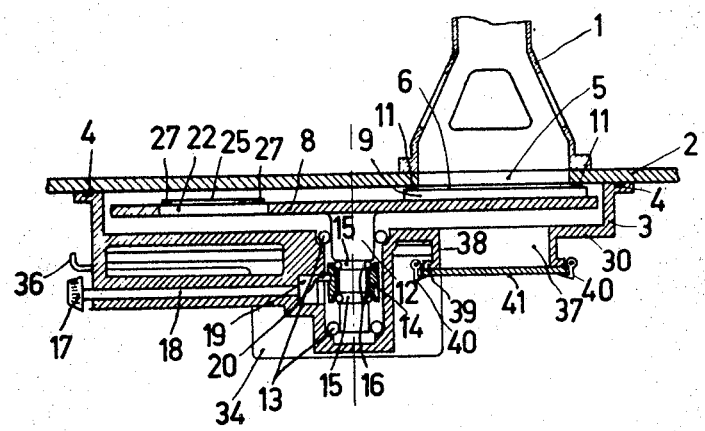

United States Patent Office 3,529,154
Patented Sept. 15, 1970

3,529,154
ELECTRON BEAM APPARATUS HAVING MEANS TO SELECTIVELY UTILIZE A LUMINESCENT SCREEN OR A PHOTOGRAPHIC PLATE
Arend Jan Bouwmeester, Emmasingel, Netherlands, assignor, by mesne assignments, to U.S. Philips Corporation, New York, N.Y., a corporation of Delaware
Filed Aug. 11, 1967, Ser. No. 659,919
Claims priority, application Netherlands, Aug. 13, 1966, 6611426
Int. Cl. H01j 37/22, 37/26
U.S. Cl. 250—49.5          7 Claims

ABSTRACT OF THE DISCLOSURE

An electron beam apparatus, for example an electron microscope, including a luminescent screen moveable in the axial direction of the electron beam and rotatable in a plane perpendicular to the electron beam axis, a magazine for photographic plates located to the side of the aperture formed when the screen is rotated out of position, and means to move a photographic plate into the position of the screen in the aperture.

---

Figure 1:
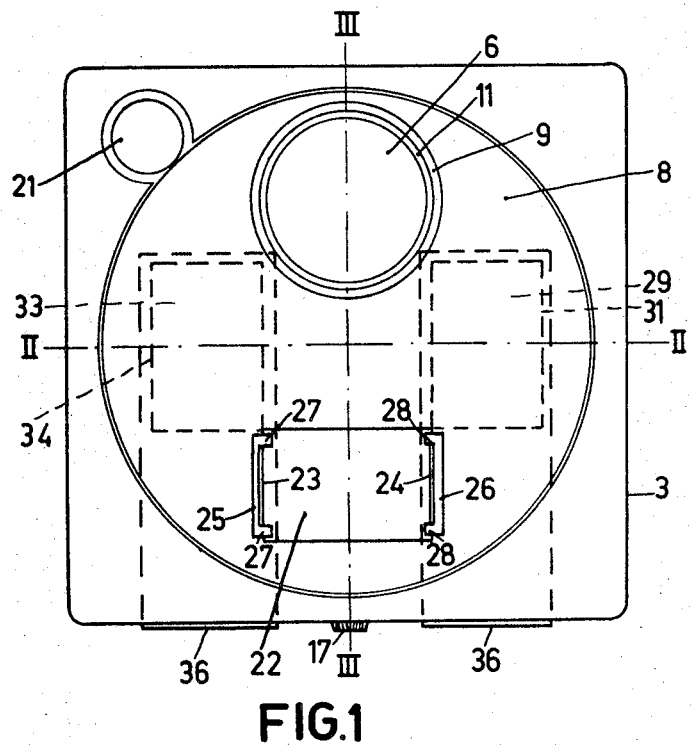

The invention relates to an electron beam apparatus, for example, an electron microscope or an electron diffraction apparatus, comprising in its base an aperture which can be sealed by a support having a luminescent screen which is moveable in the direction of the beam. A magazine for photographic plate material is provided on the side of the aperture and communicates through the aperture with the interior of the apparatus. Means are also provided for bringing a photographic plate from the magazine to below the aperture in the base of the apparatus by rotation of the support.

In a known apparatus of this type, the support is a disk which is provided in its center with a luminescent screen and is rotatable about a shaft which extends through the center of the circular aperture in the base. The support comprises an eccentrically arranged pin which is adapted to cooperate with a gap located in a laterally arranged space and comprising a photographic plate. After the support has been moved away from the base by pulling the shaft, the pin can pull the holder with the photographic plate above the support, by rotating the support, and thus below the aperture in the base. After a photograph has been taken, the holder with the plate can be pushed back into the space by again rotating the support. Each time only one photograph can be taken, after which the plate in the holder must be replaced by a new one which requires opening the space. This means wasted effort and loss of time since after placing a new plate into the holder, the space must first be evacuated again. Another drawback is that the luminescent screen may be damaged by the holder which slides on it each time. Another drawback of this known apparatus is that it is not readily suitable for applying the method of reproducing images by means of a television circuit which method finds greater acceptance, for which purpose a television camera tube is arranged behind and is optically coupled with a luminescent screen which receives the electron beam. In the known apparatus the support does not permit such an arrangement.

It is the object of the invention to provide an electron beam apparatus of the type described in which these drawbacks are avoided without unnecessarily increasing the complexity thereof.

According to the invention, an apparatus of the type described is characterized in that the axis of rotation of the support is located beyond the aperture in the base of the apparatus. The support has, in a part to be arranged above the magazine space, a continuous frame-like aperture the location of which differs from that of the luminescent screen, for receiving a photographic plate from the magazine space. For this purpose the photographic material in the magazine space can be forced towards the support by spring pressure. Furthermore, a second similar magazine space is provided for receiving the material transported by the support. This second magazine space is located at the same distance from the axis of rotation of the support as the first-mentioned magazine.

In a favorable embodiment of the apparatus according to the invention the locations of the two magazine spaces are mirror images of each other relative to the plane extending through the axis of rotation of the support and the direction of the beam, the luminescent screen and the frame-like aperture being located diametrically relative to the axis of rotation of the support.

In order to enable the use of the above-mentioned television method in an easy manner, according to a further embodiment of the invention, a cover plate sealing the space with the support on the side remote from the base comprises an aperture the center of which in the direction of the beam of electrons in the apparatus is located behind the center of the aperture in the base, which aperture can be sealed in a vacuum-tight manner. This aperture can be closed by means of a simple auxiliary member which can be replaced easily by a holder with a luminescent screen and a television camera tube coupled optically with said screen. This latter screen can be reached by the electron beam when the support is placed in such position that the frame-like aperture without photographic plate is located below the aperture in the base.

Figure 2:
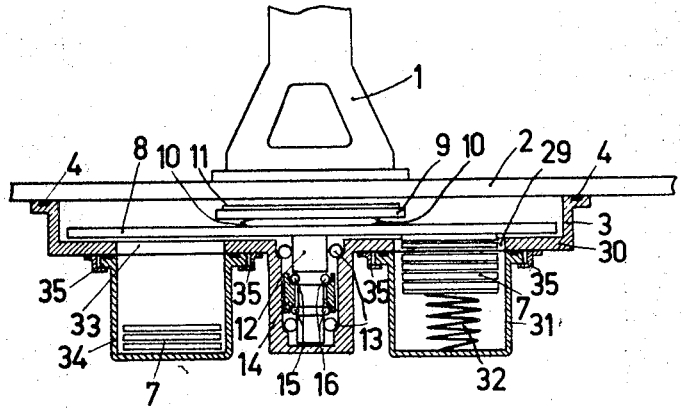

An apparatus according to the invention, in particular an electron microscope, will be described with reference to the drawing, in which FIG. 1 is a plan view of the lower part of the base with the microscope parts influencing the electrons being omitted, FIG. 2 is a cross-sectional view of this part taken along the line II—II, and FIG. 3 is a cross-sectional view of said part taken on the line III—III, and FIG. 4 is a detail for further extension of the use of the microscope.

The base of the microscope 1 comprises a base plate 2, on which the microscope is arranged, and a housing 3 which is secured to the base plate and the connection of which with the base plate is air-tight by using a rubber strip 4. The base plate 2 comprises an aperture 5 (FIG. 3). This aperture serves for passing the electron beams with which an electron image is formed on a fluorescent screen 6 or photographic plate 7 in the housing 3. The fluorescent screen and the photographic plate are each arranged to be positioned underneath the aperture 5.

Usually a photograph is taken with reference to the picture shown on the fluorescent screen. Due to damage and deformation or some other causes of object deformation a rapid transition from the visible image to the photographic picture often is necessary which has resulted in the simultaneous displacement of the support for the luminescent material and the film plate. For that purpose, the base of the microscope shown comprises in the housing a rotatable support 8 on which a plate 9 coated with luminescent material is supported by springs 10. Since exposed photographic film plates have to be removed from the housing, the plate 9 is also used to seal the aperture 5 in an air-tight manner. For that purpose, a sealing ring 11 is provided along the edge of the plate in a groove.

Sealing the aperture 5 is effected by moving the rotatable support 8 upwards for which purpose the shaft 12 thereof guided by balls 13 can be moved up and down. A sleeve 14 surrounds the shaft and is supported by balls 16 provided in grooves 15 of the shaft and the bearing surfaces of which in the sleeve 14 prevent displacement of the latter relative to the shaft while the sleeve can be rotated about the shaft without hindrance. A shaft 18, the extremity of which comprises a disk 19 having an eccentric pin 20 provided thereon, which engages a recess of the sleeve, can be rotated by means of a button 17 from outside the housing. By rotating the shaft 18, the sleeve and thus the rotatable support 8 move up and down.

FIG. 2 shows the support 8 in the lowest position, while FIG. 3 shows that the support 8 has been moved upwards, in which case the fluorescent plate 9 seals the aperture 5. In this case air may be admitted to the housing 3.

In normal use of the microscope, the housing is de-aerated and the aperture 5 may be opened. For that purpose the support 8 is moved to the lowest position after which it is freely rotatable. By actuating a driving motor, of which only the driving wheel 21 cooperating with the support is shown in FIG. 1, the support is rotated through 180°. Diametrically opposite to the place of the fluorescent screen the support has a rectangular aperture 22. Along two edges 23 and 24 thereof, two plates 25 and 26 are provided having projections 27 and 28, which extend in the aperture 22 at a short distance beyond the edges 23 and 24. A film stretched in a frame or a film plate 7 is introduced in the aperture and in the position assumed it presses against the projections 27 and 28.

Inserting the film 7 into the aperture 22 of the support is carried out while the support 8 moves. By rotating the latter, the support aperture 22 first moves beyond an aperture 29 in the bottom 30 of the housing 3, against the lower side of which a space 31 for storing a number of film sheets or plates 7 is provided. The film material is forced upwards by a spring 32 and as soon as the aperture 22 in the support 8 is located above the aperture 29 in the bottom 30 of the housing 3, a holder with film 7 jumps into the aperture 22 of the support and cannot be removed therefrom when the support 8 continues its movement. The driving mechanism for the support 8 comprises means, for example, electric contacts, which interrupt the electric current for the energization of the motor when the support has been rotated so far that the aperture 22 with the film 7 has arrived opposite to the aperture 5 in the base plate 2. In the example shown the support has performed half a rotation. After taking the picture, the support 8 performs the next half rotation. During the rotating movement the aperture 22 in the support will become located above another aperture 33 in the bottom 30 of the housing 3 for a short while, against the lower side of which the space 34 for receiving the exposed film material 7 is provided. As a result of the lack of any support at that instant, the film holder or plate will fall into said space 34 as a result of its own weight. The rotation of the support 8 is then completed and the driving mechanism is deactuated again, after which a fluorescent picture can be observed or a following film plate can be provided in the place destined for making a picture by again rotating the support 8. The two spaces 31 and 34, one being provided with unexposed film material and the other for being emptied can easily be removed after the aperture 5 in the base plate is closed by the fluorescent plate 9 and air is admitted to the housing 3. The spaces can be moved along profiled frames 35 arranged on the outside against the bottom 30 of the housing 3, and can both be removed in the same direction by pulling. For that purpose each space comprises a grip 36.

Of course the spaces must be provided with a light-tight seal for which purpose a sliding cover may serve which in an otherwise known manner is removed when a space is moved to the operative position and is closed when the space is moved in the opposite direction.

A special measure which makes the microscope suitable for connection to a television circuit without further difficulty consists in a third aperture 37 which is arranged in the bottom of the housing 3 and the center of which coincides with the axis of the microscope. A projection 38 which is directed downwards comprises a connection edge 39 against which a cover plate 41 is forced in an airtight manner by means of toggles 40. The cover plate 41 may be replaced by a holder 42 which comprises a transmission fluorescent screen 42, an optical lens 44 and a television camera tube 45 of the vidicon type and the edge 46 of which is clamped against the connection edge 39 of the projection 38 by means of the toggles 40. By reversing the direction of rotation of the drive of the support 8, the latter can perform half a rotation in the opposite direction, the aperture 22 of the support moving along the aperture 32 in the bottom 30 of the housing 3, which communicates with the space 34 for receiving the exposed film plates. The result is that after performing half a rotation, the support 8 assumes the position in which the aperture 22 is located opposite the aperture 5 in the base plate 2 and the radiation from the microscope can reach the transmission screen 42 of the television camera device without hindrance. The switching of the direction of rotation of a driving mechanism, which in itself is simple, can be done with known means.

While the invention has been described with reference to a particular embodiment and applications thereof, other modifications will be apparent to those skilled in this art without departing from the spirit and scope of the invention which is defined in the appended claims.

What is claimed is:

1. In an electron beam apparatus having a given electron beam direction, a base having an aperture therein in the path of the electron beam, a support beneath said base having a frame-like aperture for receiving a plate of photographic material and having an axis of rotation displaced from said electron beam direction, a luminescent screen on said support for movement into the path of the electron beam to produce a luminescent image thereof, means to move said support in the direction of the electron beam and to rotate said support to thereby move the luminescent screen into and out of the aperture in said base, a housing beneath said support including a magazine space for storage of photographic plate material, said housing having an aperture therein aligning said magazine with said frame-like aperture upon rotation of said support, means to move a plate of photographic material upwardly into said frame-like aperture, whereby upon rotation of the support the plate is positioned in the path of the electron beam, said housing having a second magazine space for receiving exposed photographic plates upon further rotation of the support carrying the exposed photographic plate out of the path of the electron beam.

2. An apparatus as claimed in claim 1 in which the places of the two magazine spaces are mirror images of each other relative to the plane passing through the axis of rotation of the support and the direction of the beam, the luminescent screen and the frame-like aperture being located diametrically relative to the axis of rotation of the support.

3. An apparatus as claimed in claim 2 in which the magazine spaces are each constituted by a sliding drawer which in the operating condition is forced against the outside of a locking plate sealing the space with the support on the side remote from the base in a vacuum-tight manner, which plate is provided above each magazine with an aperture suitable for passing the photographic material.

4. An apparatus as claimed in claim 3 in which guiding paths are provided for the sliding drawers which extend parallel to the plane which is determined by the axis of rotation of the support and the direction of the beam.

5. An apparatus as claimed in claim 4 in which an eccentric which is rotatable about a shaft which extends at right angles to the axis of rotation for displacing the support in the direction of the beam and cooperates with a supporting sleeve surrounding the shaft of the support, the luminescent screen being provided on a disk which is supported in a resilient manner by the remaining part of the support.

6. An apparatus as claimed in claim 5 in which a locking plate which seals the space with the support on the side remote from the base comprises an aperture the center of which, in the direction of the electron beam in the apparatus, is located behind the center of the aperture in the base, said aperture being sealed in a vacuum-tight manner.

7. An apparatus as claimed in claim 6 in which a holder with a luminescent screen and a television camera tube coupled optically therewith, is connected to the aperture in the locking plate.

References Cited

FOREIGN PATENTS 754,853  11/1933  France.
857,555  12/1952  Germany.

OTHER REFERENCES

"Brighter Image," from Electronics, vol. 37, No. 26, Oct. 5, 1964, pages 32 and 34.

WILLIAM F. LINDQUIST, Primary Examiner

U.S. Cl. X.R.

250—66